US012764696B2

(12) United States Patent
Balasubramaniam et al.

(10) Patent No.: US 12,764,696 B2
(45) Date of Patent: Oct. 13, 2026

(54) METHOD, APPARATUS AND COMPUTER PROGRAM

(71) Applicant: Nokia Technologies Oy, Espoo (FI)

(72) Inventors: Sankaran Balasubramaniam, Bangalore (IN); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 213 days.

(21) Appl. No.: 18/727,588

(22) PCT Filed: Dec. 27, 2022

(86) PCT No.: PCT/EP2022/087881
§ 371 (c)(1),
(2) Date: Jul. 9, 2024

(87) PCT Pub. No.: WO2023/131568
PCT Pub. Date: Jul. 13, 2023

(65) Prior Publication Data

US 2025/0088997 A1 Mar. 13, 2025

(30) Foreign Application Priority Data

Jan. 10, 2022 (IN) ............................ 202241001258

(51) Int. Cl.
*H04W 60/04* (2009.01)
*H04W 8/20* (2009.01)
*H04W 76/20* (2018.01)

(52) U.S. Cl.
CPC ............ *H04W 60/04* (2013.01); *H04W 8/20* (2013.01); *H04W 76/20* (2018.02)

(58) Field of Classification Search
None
See application file for complete search history.

(56) References Cited

U.S. PATENT DOCUMENTS

2019/0158628 A1* 5/2019 Fu .......................... G06N 3/105
2020/0265493 A1* 8/2020 Kumar Addepalli ........................ G06Q 30/0619
2020/0265509 A1* 8/2020 Kumar Addepalli ........................ G06F 21/101

(Continued)

*Primary Examiner* — Otis L Thompson, Jr.
(74) *Attorney, Agent, or Firm* — Barta Jones, PLLC

(57) ABSTRACT

There is provided an apparatus for a core network entity, the apparatus comprising means configured to perform: receiving, from a network node, an indication of one or more first analytics identities that are supported by the network node; receiving, from a terminal, a registration request message; accessing subscription information of the terminal, the subscription information comprising one or more second analytics identities that are subscribed to by the terminal, wherein the one or more first analytics identities and the one or more second analytics identities are each associated with respective machine learning models. The apparatus further comprising means configured to perform, determining a list of authorised analytics identities, that are authorised for use by the network node for the terminal, using: i) the received indication of the one or more first analytics identities that are supported by the network node, and ii) the subscription information of the terminal; and providing, to the network node, the list of authorised analytics identities that are authorised for use by the network node for the terminal.

20 Claims, 9 Drawing Sheets

(56) References Cited

U.S. PATENT DOCUMENTS

| | | | | |
|---|---|---|---|---|
| 2020/0334567 | A1* | 10/2020 | Bhattacharjee | H04L 67/125 |
| 2022/0060390 | A1* | 2/2022 | Li | H04L 67/51 |
| 2022/0108214 | A1* | 4/2022 | Lee | H04W 48/18 |
| 2025/0111223 | A1* | 4/2025 | Fu | G06N 3/08 |
| 2025/0126030 | A1* | 4/2025 | Aggarwal | H04L 41/5051 |
| 2025/0310214 | A1* | 10/2025 | Ly | H04L 41/0894 |

* cited by examiner

METHOD, APPARATUS AND COMPUTER PROGRAM

FIELD

The present application relates to a method, apparatus, and computer program for a wireless communication system.

BACKGROUND

A communication system may be a facility that enables communication sessions between two or more entities such as user terminals, base stations/access points and/or other nodes by providing carriers between the various entities involved in the communications path. A communication system may be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus for a core network entity, the apparatus comprising means configured to perform: receiving, from a network node, an indication of one or more first analytics identities that are supported by the network node; receiving, from a terminal, a registration request message; accessing subscription information of the terminal, the subscription information comprising one or more second analytics identities that are subscribed to by the terminal, wherein the one or more first analytics identities and the one or more second analytics identities are each associated with respective machine learning models; determining a list of authorised analytics identities, that are authorised for use by the network node for the terminal, using: i) the received indication of the one or more first analytics identities that are supported by the network node, and ii) the subscription information of the terminal; and providing, to the network node, the list of authorised analytics identities that are authorised for use by the network node for the terminal.

In an example, the registration request message comprises an identifier of the terminal, and the subscription information is accessed using the identifier of the terminal.

In an example, at least one of: the one or more first analytics identities, and the one or more second analytics identities comprises a plurality of analytics identities.

In an example, the list of authorised analytics identities is specific to the terminal.

In an example, the indication of one or more analytics identities that are supported by the network node is received as part of a next generation setup procedure.

In an example, the list of authorised analytics identities that are authorised for use by the network node for the terminal is provided to the network node in an initial context setup request message, or a handover request message.

In an example, the means configured to perform accessing subscription information of the terminal comprises: means configured to perform: retrieving the subscription information of the terminal from a further core network entity.

In an example, the means configured to perform the determining the list of authorised analytics identities that are authorised for use by the network node for the terminal comprises: means configured to perform: determining analytics identities that are both, i) subscribed to by the terminal, and ii) supported by the network node.

In an example, the list of authorised analytics identities comprises only analytics identifiers that are both, i) subscribed to by the terminal, and ii) supported by the network node.

In an example, the one or more analytics identities that are supported by the network node are associated with a tracking area identifier of the network node, and/or network slice support assistance information of the network node.

In an example, the means are configured to perform: receiving, from the terminal, a message comprising a list of requested analytics identities that the terminal requests to have authorisation to use.

In an example, the core network entity uses the list of requested analytics identities that the terminal requests to have authorisation to use, to determine the list of authorised analytics identities.

In an example, the list of requested analytics identities that the terminal requests to have authorisation to use is provided in the registration request message.

In an example, the registration request message is a non-access stratum registration request message.

In an example, the means are configured to perform: receiving, from a network node, an update message, the update message comprising an indication of one or more third analytics identities that are supported by the network node; and determining an updated list of authorised analytics identities that are authorised for use by the network node for the terminal using the received indication of the one or more third analytics identities that are supported by the network node.

In an example, the means are configured to perform: determining that the terminal has moved into coverage of a target network node; and providing the list of authorised analytics identities to the target network node as part of handover signalling.

According to an aspect, there is provided an apparatus for a core network entity, the apparatus comprising: one or more processors, and memory storing instructions that, when executed by the one or more processors, cause the apparatus to perform: receiving, from a network node, an indication of one or more first analytics identities that are supported by the network node; receiving, from a terminal, a registration request message; accessing subscription information of the terminal, the subscription information comprising one or more second analytics identities that are subscribed to by the terminal, wherein the one or more first analytics identities and the one or more second analytics identities are each associated with respective machine learning models; determining a list of authorised analytics identities, that are authorised for use by the network node for the terminal, using: i) the received indication of the one or more first analytics identities that are supported by the network node, and ii) the subscription information of the terminal; and providing, to the network node, the list of authorised analytics identities that are authorised for use by the network node for the terminal.

In an example, the registration request message comprises an identifier of the terminal, and the subscription information is accessed using the identifier of the terminal.

In an example, at least one of: the one or more first analytics identities, and the one or more second analytics identities comprises a plurality of analytics identities.

In an example, the list of authorised analytics identities is specific to the terminal.

In an example, the indication of one or more analytics identities that are supported by the network node is received as part of a next generation setup procedure.

In an example, the list of authorised analytics identities that are authorised for use by the network node for the terminal is provided to the network node in an initial context setup request message, or a handover request message.

In an example, the apparatus caused to perform accessing subscription information of the terminal comprises: retrieving the subscription information of the terminal from a further core network entity.

In an example, the apparatus caused perform the determining the list of authorised analytics identities that are authorised for use by the network node for the terminal comprises: determining analytics identities that are both, i) subscribed to by the terminal, and ii) supported by the network node.

In an example, the list of authorised analytics identities comprises only analytics identifiers that are both, i) subscribed to by the terminal, and ii) supported by the network node.

In an example, the one or more analytics identities that are supported by the network node are associated with a tracking area identifier of the network node, and/or network slice support assistance information of the network node.

In an example, the apparatus is caused to perform: receiving, from the terminal, a message comprising a list of requested analytics identities that the terminal requests to have authorisation to use.

In an example, the apparatus uses the list of requested analytics identities that the terminal requests to have authorisation to use, to determine the list of authorised analytics identities.

In an example, the list of requested analytics identities that the terminal requests to have authorisation to use is provided in the registration request message.

In an example, the registration request message is a non-access stratum registration request message.

In an example, the apparatus is caused to perform: receiving, from a network node, an update message, the update message comprising an indication of one or more third analytics identities that are supported by the network node; and determining an updated list of authorised analytics identities that are authorised for use by the network node for the terminal using the received indication of the one or more third analytics identities that are supported by the network node.

In an example, the apparatus is caused to perform: determining that the terminal has moved into coverage of a target network node; and providing the list of authorised analytics identities to the target network node as part of handover signalling.

According to an aspect, there is provided an apparatus for a network node, the apparatus comprising means configured to perform: providing, to a core network entity, an indication of one or more first analytics identities that are supported by the network node, wherein the one or more first analytics identities are associated with respective machine learning models; providing, from a terminal to the core network entity, a registration request message; and receiving, from the core network entity, a list of authorised analytics identities that are authorised for use by the network node for the terminal.

In an example, the network node provides the serving cell for the terminal.

In an example, the list of authorised analytics identities comprises at least one of the one or more analytics identities that are supported by the network node.

In an example, the indication of one or more analytics identities that are supported by the network node is provided as part of a next generation setup procedure.

In an example, the means are configured to perform: before the providing: determining one or more machine learning models that are supported by the network node; and assigning respective analytics identities to each of the one or more machine learning models to determine the one or more first analytics identities.

In an example, the means are configured to perform: determining a first analytics identity from the list of authorised analytics identities for use with the terminal; and using a first machine learning model with the terminal, the first machine learning model associated with the first analytics identity.

In an example, the means are configured to perform: determining a change in the support for the one or more analytics identities at the network node; in response to the determining, providing, to the core network entity, an update message, the update message comprising a further indication of one or more third analytics identities that are supported by the network node; and receiving, from the core network entity, an updated list of authorised analytics identities that are authorised for use by the terminal.

In an example, the one or more analytics identities that are supported by the network node are associated with a tracking area identifier of the network node, and/or network slice support assistance information of the network node.

In an example, the means are configured to perform: determining that the terminal has moved to a radio resource control inactive state; and continuing to use the first machine learning model, while the terminal is in the radio resource control state, in a radio access network notification area corresponding to the tracking area identifier of the network node that the first machine learning model has been authorised in.

According to an aspect, there is provided an apparatus for a network node, the apparatus comprising: one or more processors, and memory storing instructions that, when executed by the one or more processors, cause the apparatus to perform: providing, to a core network entity, an indication of one or more first analytics identities that are supported by the network node, wherein the one or more first analytics identities are associated with respective machine learning models; providing, from a terminal to the core network entity, a registration request message; and receiving, from the core network entity, a list of authorised analytics identities that are authorised for use by the network node for the terminal.

In an example, the network node provides the serving cell for the terminal.

In an example, the list of authorised analytics identities comprises at least one of the one or more analytics identities that are supported by the network node.

In an example, the indication of one or more analytics identities that are supported by the network node is provided as part of a next generation setup procedure.

In an example, the apparatus is caused to perform: before the providing: determining one or more machine learning models that are supported by the network node; and assigning respective analytics identities to each of the one or more machine learning models to determine the one or more first analytics identities.

In an example, the apparatus is caused to perform: determining a first analytics identity from the list of authorised analytics identities for use with the terminal; and using a first machine learning model with the terminal, the first machine learning model associated with the first analytics identity.

In an example, the apparatus is caused to perform: determining a change in the support for the one or more analytics identities at the network node; in response to the determining, providing, to the core network entity, an update message, the update message comprising a further indication of one or more third analytics identities that are supported by the network node; and receiving, from the core network entity, an updated list of authorised analytics identities that are authorised for use by the terminal.

In an example, the one or more analytics identities that are supported by the network node are associated with a tracking area identifier of the network node, and/or network slice support assistance information of the network node.

In an example, the apparatus is caused to perform: determining that the terminal has moved to a radio resource control inactive state; and continuing to use the first machine learning model, while the terminal is in the radio resource control state, in a radio access network notification area corresponding to the tracking area identifier of the network node that the first machine learning model has been authorised in.

According to an aspect, there is provided an apparatus for a terminal, the apparatus comprising means configured to perform: providing, to a core network entity via a network node, a registration request message; and receiving a service, from the network node, the service associated with an analytics identity from a list of authorised analytics identities determined by the core network entity based on subscription information of the terminal, the subscription information comprising one or more analytics identities that are subscribed to by the terminal, wherein the one or more analytics identities are associated with respective machine learning models.

According to an aspect, there is provided an apparatus for a network node, the apparatus comprising: one or more processors, and memory storing instructions that, when executed by the one or more processors, cause the apparatus to perform: providing, to a core network entity via a network node, a registration request message; and receiving a service, from the network node, the service associated with an analytics identity from a list of authorised analytics identities determined by the core network entity based on subscription information of the terminal, the subscription information comprising one or more analytics identities that are subscribed to by the terminal, wherein the one or more analytics identities are associated with respective machine learning models.

According to an aspect, there is provided a method performed by a core network entity, the method comprising: receiving, from a network node, an indication of one or more first analytics identities that are supported by the network node; receiving, from a terminal, a registration request message; accessing subscription information of the terminal, the subscription information comprising one or more second analytics identities that are subscribed to by the terminal, wherein the one or more first analytics identities and the one or more second analytics identities are each associated with respective machine learning models; determining a list of authorised analytics identities, that are authorised for use by the network node for the terminal, using: i) the received indication of the one or more first analytics identities that are supported by the network node, and ii) the subscription information of the terminal; and providing, to the network node, the list of authorised analytics identities that are authorised for use by the network node for the terminal.

In an example, the registration request message comprises an identifier of the terminal, and the subscription information is accessed using the identifier of the terminal.

In an example, at least one of: the one or more first analytics identities, and the one or more second analytics identities comprises a plurality of analytics identities.

In an example, the list of authorised analytics identities is specific to the terminal.

In an example, the indication of one or more analytics identities that are supported by the network node is received as part of a next generation setup procedure.

In an example, the list of authorised analytics identities that are authorised for use by the network node for the terminal is provided to the network node in an initial context setup request message, or a handover request message.

In an example, the accessing subscription information of the terminal comprises: retrieving the subscription information of the terminal from a further core network entity.

In an example, the determining the list of authorised analytics identities that are authorised for use by the network node for the terminal comprises: determining analytics identities that are both, i) subscribed to by the terminal, and ii) supported by the network node.

In an example, the list of authorised analytics identities comprises only analytics identifiers that are both, i) subscribed to by the terminal, and ii) supported by the network node.

In an example, the one or more analytics identities that are supported by the network node are associated with a tracking area identifier of the network node, and/or network slice support assistance information of the network node.

In an example, the method comprises: receiving, from the terminal, a message comprising a list of requested analytics identities that the terminal requests to have authorisation to use.

In an example, the core network entity uses the list of requested analytics identities that the terminal requests to have authorisation to use, to determine the list of authorised analytics identities.

In an example, the list of requested analytics identities that the terminal requests to have authorisation to use is provided in the registration request message.

In an example, the registration request message is a non-access stratum registration request message.

In an example, the method comprises: receiving, from a network node, an update message, the update message comprising an indication of one or more third analytics identities that are supported by the network node; and determining an updated list of authorised analytics identities that are authorised for use by the network node for the terminal using the received indication of the one or more third analytics identities that are supported by the network node.

In an example, the method comprises: determining that the terminal has moved into coverage of a target network node; and providing the list of authorised analytics identities to the target network node as part of handover signalling.

According to an aspect, there is provided a method performed by a network node, the method comprising: providing, to a core network entity, an indication of one or more first analytics identities that are supported by the network node, wherein the one or more first analytics identities are associated with respective machine learning models; providing, from a terminal to the core network entity, a registration request message; and receiving, from the core network entity, a list of authorised analytics identities that are authorised for use by the network node for the terminal.

In an example, the network node provides the serving cell for the terminal.

In an example, the list of authorised analytics identities comprises at least one of the one or more analytics identities that are supported by the network node.

In an example, the indication of one or more analytics identities that are supported by the network node is provided as part of a next generation setup procedure.

In an example, the method comprises: before the providing: determining one or more machine learning models that are supported by the network node; and assigning respective analytics identities to each of the one or more machine learning models.

In an example, the method comprises: determining a first analytics identity from the list of authorised analytics identities for use with the terminal; and using a first machine learning model with the terminal, the first machine learning model associated with the first analytics identity.

In an example, the method comprises: determining a change in the support for the one or more analytics identities at the network node; in response to the determining, providing, to the core network entity, an update message, the update message comprising a further indication of one or more analytics identities that are supported by the network node; and receiving, from the core network entity, an updated list of authorised analytics identities that are authorised for use by the terminal.

In an example, the one or more analytics identities that are supported by the network node are associated with a tracking area identifier of the network node, and/or network slice support assistance information of the network node.

In an example, the method comprises: determining that the terminal has moved to a radio resource control inactive state; and continuing to use the first machine learning model, while the terminal is in the radio resource control state, in a radio access network notification area corresponding to the tracking area identifier of the network node that the first machine learning model has been authorised in.

According to an aspect, there is provided a method performed by a terminal, the method comprising: providing, to a core network entity via a network node, a registration request message; and receiving a service, from the network node, the service associated with an analytics identity from a list of authorised analytics identities determined by the core network entity based on subscription information of the terminal, the subscription information comprising one or more analytics identities that are subscribed to by the terminal, wherein the one or more analytics identities are associated with respective machine learning models.

According to an aspect, there is provided a computer program comprising computer executable instructions which when run on one or more processors perform: receiving, from a network node, an indication of one or more first analytics identities that are supported by the network node; receiving, from a terminal, a registration request message; accessing subscription information of the terminal, the subscription information comprising one or more second analytics identities that are subscribed to by the terminal, wherein the one or more first analytics identities and the one or more second analytics identities are each associated with respective machine learning models; determining a list of authorised analytics identities, that are authorised for use by the network node for the terminal, using: i) the received indication of the one or more first analytics identities that are supported by the network node, and ii) the subscription information of the terminal; and providing, to the network node, the list of authorised analytics identities that are authorised for use by the network node for the terminal.

According to an aspect, there is provided a computer program comprising computer executable instructions which when run on one or more processors perform: providing, to a core network entity, an indication of one or more first analytics identities that are supported by the network node, wherein the one or more first analytics identities are associated with respective machine learning models; providing, from a terminal to the core network entity, a registration request message; and receiving, from the core network entity, a list of authorised analytics identities that are authorised for use by the network node for the terminal.

According to an aspect, there is provided a computer program comprising computer executable instructions which when run on one or more processors perform: providing, to a core network entity via a network node, a registration request message; and receiving a service, from the network node, the service associated with an analytics identity from a list of authorised analytics identities determined by the core network entity based on subscription information of the terminal, the subscription information comprising one or more analytics identities that are subscribed to by the terminal, wherein the one or more analytics identities are associated with respective machine learning models.

A computer product stored on a medium may cause an apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

According to some aspects, there is provided the subject matter of the independent claims. Some further aspects are defined in the dependent claims. The embodiments that do not fall under the scope of the claims are to be interpreted as examples useful for understanding the disclosure.

LIST OF ABBREVIATIONS

AF: Application Function
AMF: Access Management Function
AN: Access Network
BS: Base Station
CN: Core Network
DL: Downlink
eNB: eNodeB
gNB: gNodeB
LTE: Long Term Evolution
NEF: Network Exposure Function
NG-RAN: Next Generation Radio Access Network
NF: Network Function
NR: New Radio
NRF: Network Repository Function
NSSAI: Network Slice Selection Assistance Information NW: Network
NWDAF: Network Data Analytics Function
MS: Mobile Station
PCF Policy Control Function
PLMN: Public Land Mobile Network
RAN: Radio Access Network
RF: Radio Frequency
RNA: RAN Notification Area
SMF: Session Management Function
TAI: Tracking Area Identity
UE: User Equipment
UDR: Unified Data Repository
UDM: Unified Data Management
UL: Uplink
UPF: User Plane Function
3GPP: 3rd Generation Partnership Project
5G: 5th Generation
5GC: 5G Core network
5G-AN: 5G Radio Access Network
5GS: 5G System

DESCRIPTION OF FIGURES

Embodiments will now be described, by way of example only, with reference to the accompanying Figures in which.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
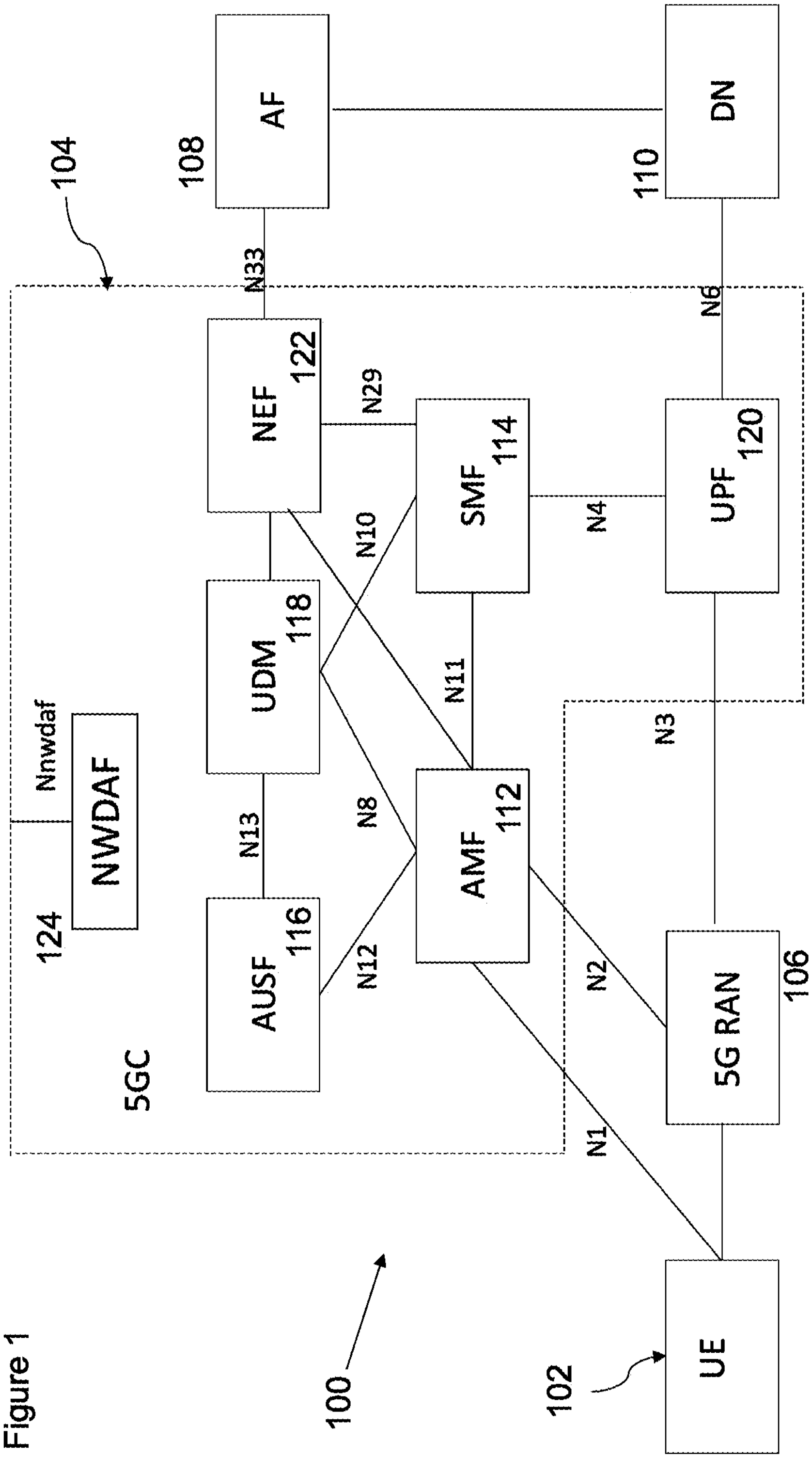
FIG. 1 shows a schematic representation of a 5G system.

In a wireless communication system 100, such as that shown in FIG. 1, mobile communication devices/terminals or user apparatuses, and/or user equipments (UE), and/or machine-type communication devices 102 are provided wireless access via at least one base station (not shown) or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

In the following certain examples are explained with reference to mobile communication devices capable of communication via a wireless cellular system and mobile communication systems serving such mobile communication devices. Before explaining in detail the examples of disclose, certain general principles of a wireless communication system, access systems thereof, and mobile communication devices are briefly explained with reference to FIGS. 1, 2 and 3 to assist in understanding the technology underlying the described examples.

FIG. 1 shows a schematic representation of a 5G system (5GS) 100. The 5GS may comprises a device 102 such as user equipment or terminal, a 5G access network (5G-AN) 106, a 5G core network (5GC) 104, one or more network functions (NF), one or more application function (AF) 108 and one or more data networks (DN) 110.

The 5G-AN 106 may comprise one or more gNodeB (gNB) distributed unit functions connected to one or more gNodeB (gNB) centralized unit functions.

The 5GC 104 may comprise an access management function (AMF) 112, a session management function (SMF) 114, an authentication server function (AUSF) 116, a user data management (UDM) 118, a user plane function (UPF) 120, a network exposure function (NEF) 122, a network data analytics function (NWDAF) 124, and/or other NFs. Some of the examples as shown below may be applicable to 3GPP 5G standards. However, some examples may also be applicable to 4G, 3G and other 3GPP standards.

In a communication system, such as that shown in FIG. 1, mobile communication devices/terminals or user apparatuses, and/or user equipments (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a station or access point, and transmit and/or receive communications on the carrier.

Figure 2:
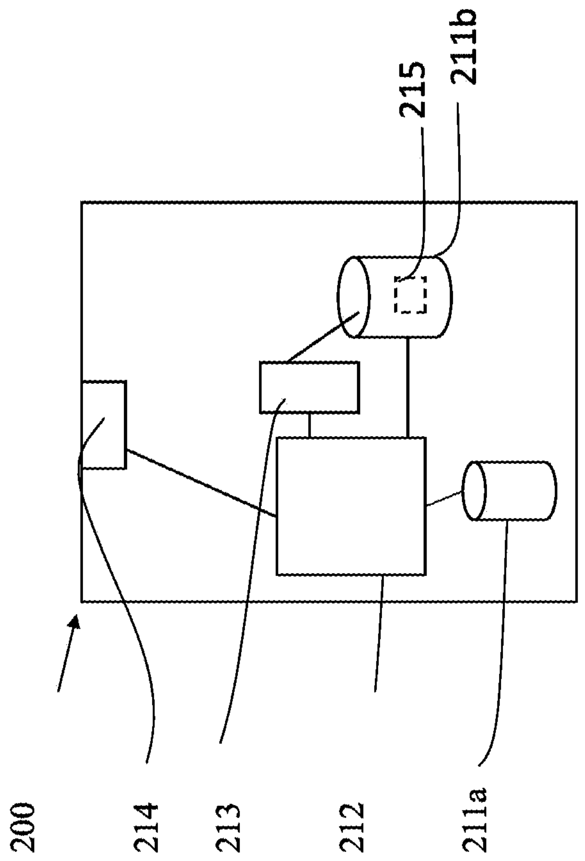
FIG. 2 shows a schematic representation of a control apparatus.

FIG. 2 illustrates an example of a control apparatus 200 for controlling a function of the 5G-AN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G-AN or the 5GC. In some examples, each function of the 5G-AN or the 5GC comprises a control apparatus 200. In alternative examples, two or more functions of the 5G-AN or the 5GC may share a control apparatus.

Figure 3:
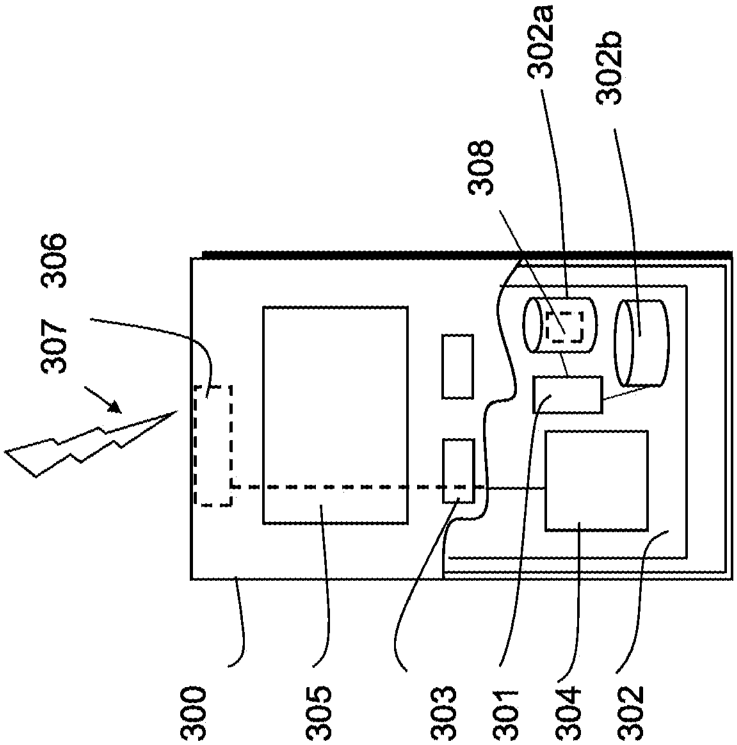
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*a* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus may be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Artificial intelligence (AI)/machine learning (ML) based inference is proposed to be used in various areas of wireless networks, including the RAN. Some of the cases wherein AI/ML models are being used are becoming progressively more complex. The use of AI/ML in wireless communication networks is expected to improve the overall network performance, ultimately providing a better experience for the end user. Further, AI/ML is being used in applications that have an increasing visibility to the end user. In some examples, AI/ML based services may be offered as a premium service for users that could be marketed/sold by an operator to paying customers. This example enables AI/ML services to be selectively applied for some users in the RAN.

In an example use case, AI/ML based inference in the RAN is utilising an applicable ML model to be used on all UEs in the RAN. In other example use cases, the AI/ML model is used by UEs that have subscribed to a given AI/ML based service (i.e. not used by UEs which have not subscribed). The subscribed service could be a paid service that the operators could monetise. For example, the subscribed AI/ML service could be a service with an additional one off charge, or a monthly charge. In examples, the subscribed service could be associated with a protocol data unit (PDU) session. Alternatively, the subscribed service could be common across multiple/all PDU sessions. In current systems, there is no mechanism whereby the RAN and/or core network entities could determine/know a list of AI/ML based services that a given UE has subscribed to.

In an example scenario, an operator may provide an AI/ML based service for secondary cell (SCell) selection/addition procedure in a carrier aggregation. The AI/ML service may ensure that an appropriate SCell is added as per, for example, the services/slices that the user has subscribed to, the current/projected load of the SCell etc. This ensures that the service requirements/QoS are met in an optimised manner, resulting in a good user experience. The AI/ML service may be a paid service that a user can subscribe. If the user subscribes to this service, the subscription information will be available only in the core network (UDM/UDR). However, as this AI/ML service will run on the RAN, the RAN will not know whether the UE has subscribed to this service or not.

One or more of the following examples aim to address one or more of the problems identified above.

In some examples, so that an applied UE subscription for AI/ML models that are maintained in the RAN can function, a communication mechanism between a UE, a RAN and a 5GC is provided to align these entities. In examples, the RAN indicates to the 5GC any AI/ML models (via associated analytics IDs) that are supported by the RAN, at the time of an NG Setup procedure. The 5GC, as part of the user registration, authorises the UE to use a set of ML models that the UE has subscribed for and provides this list to the RAN, per UE. The RAN may then apply a given AI/ML model on those UEs that have been authorized by the 5GC.

This will all be described in more detail below.

Figure 4A:
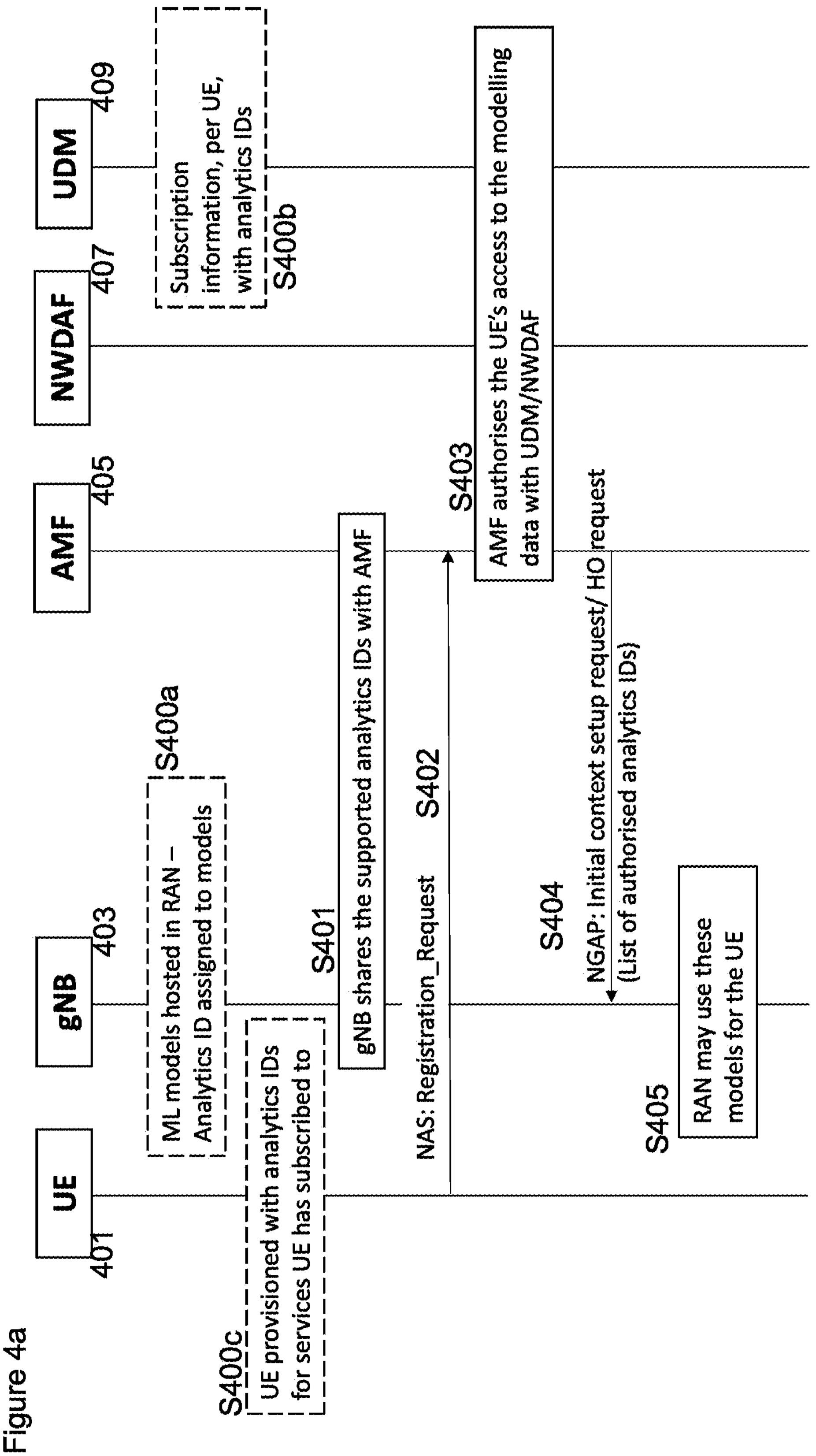
FIGS. 4*a* and 4*b* show an example signalling diagram between a user equipment, a base station, and core network entities.
Figure 4B:
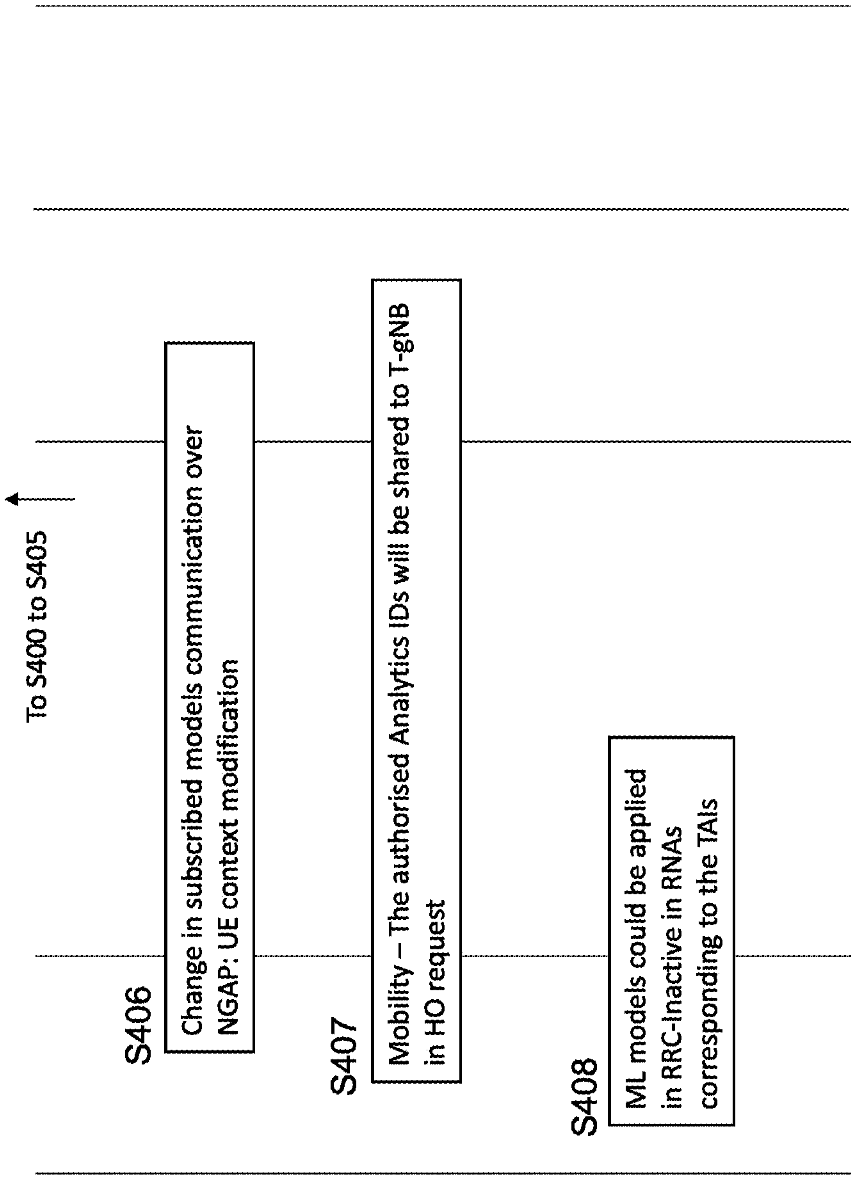

FIGS. 4*a* and 4*b* show an example signalling diagram between a user equipment/terminal, a base station and core network entities. As seen in FIGS. 4*a* and 4*b*, there are communications between a UE 401, a base station (gNB) 403, an AMF 405, an NWDAF 407, and a UDM 409. In this example, the gNB 403 is the serving base station for the UE 401.

In S400*a*, the gNB 403 (RAN) is configured with a set of ML models that the RAN may use. The ML models are hosted in the RAN. Each ML model may have an associated analytics identity (ID). It should be understood that 'ML models' and 'AI models' may be used interchangeably in the following. In some examples, the set of ML models may comprise a plurality of ML models, each with an associated analytics ID. In other examples, the set of ML models comprises a single ML model. In some examples, the gNB 403 determines ML models that are supported at the gNB 403, and assign respective analytics IDs to each of the ML models that are supported.

In S400*b*, the 5GC has subscription information for UEs/terminals. The subscription information may comprise a list of subscribed analytics IDs per UE. In some examples, the 5GC will have a plurality of lists (one list per UE). The lists of subscribed analytics IDs may be stored in the 5GC. For example, the subscription information/record may be stored in the UDM/UDR 409 of the 5GC. In another example, the subscription information and/or analytics IDs associated with the UEs may be stored in the NWDAF/management data analytics service (MDAS) 407 of the 5GC.

In S400*c*, a network operator may provide the UE 401 with a list of analytics IDs that the UE 401 has subscribed to and may access. For example, the list of analytics IDs may correspond to ML models to be used for different applications.

In S401, the gNB 403 provides the list of analytics IDs that the RAN supports to the AMF 405 of the 5GC. In an example, the list of analytics IDs is provided in an NG setup request message. In other examples, other suitable message types are used. The provision of the list of analytics IDs to the 5GC gives the 5GC visibility into the service(s)/ML model(s) that the UE 401 may receive from the (serving) gNB 403.

In some examples, the list of analytics IDs comprises information of one or more tracking area identities (TAI)

that the gNB 403 supports. In some examples, the list of analytics IDs comprises information of network slice support assistance information (NSSAI) that the gNB 403 supports. In some examples, each analytics ID in the list of analytics IDs is associated with at least one of: a TAI, and NSSAI that the gNB 403 supports. For example, the information in the list may indicate that the gNB 403 supports a first analytics ID in a first TAI, but not in a second TAI.

In S402, the UE 401 provides a registration request message to the AMF 405, via the gNB 403. The registration request message may be a non-access stratum (NAS) registration request message. In other examples, other suitable message types are used.

In some examples, the registration request message comprises an identifier of the UE 401.

In some examples, the UE 401 provides a list of requested analytics IDs to the AMF 405 in the registration request message. The list of requested analytics IDs may comprise a list of services (associated with the analytics IDs) that the UE 401 would like to gain access to. The list of requested analytics IDs may be used by the AMF 405 (i.e. the network) to determine which services to offer to the UE 401.

In other examples, the UE 401 does not provide the list of requested analytics IDs to the AMF 405. In this example, the process is managed/controlled by the network where network will determine applicable analytics IDs for the UE 401 based on subscription data/record of the UE 401. In some examples, this may be the default option.

In S403, the AMF 405 determines a list of authorised analytics IDs. In some examples, the AMF 405 will access the subscription information for the UE 401 that provided the registration request message. For example, the subscription information is accessed by the AMF 405 using the identifier of the UE 401 from the registration request message.

The AMF 405 may use at least one of: i) the subscription information of the UE 401 (i.e. the list of subscribed analytics IDs for the UE 401), and ii) the received list of analytics IDs supported by the gNB 403, in order to determine the authorised analytics IDs.

In some examples, the list of authorised analytics identities comprises analytics identifiers that are both, i) subscribed to by the terminal, and ii) supported by the network node.

In examples when the UE 401 also provides a list of requested analytics IDs to the AMF 405 in the NAS registration request message, the AMF 405 may also use the requested analytics IDs to determine which analytics IDs to authorise.

In some examples, all of the analytics IDs in the received list will be authorised for the UE 401. In other examples, the AMF 405 will authorise a subset of the analytics IDs in the received list for the UE 401. For example, one or more analytics ID in the list may not be authorised by the AMF 405 as per a subscription information of the UE 401. For example, a requested analytics ID is not available in the subscription information of the UE 401. In that case, the authorization fails, and that analytics ID shall not be assigned to the UE 401. For example, one or more analytics ID in the list may not be authorised when the requested analytics ID is not supported by the 5GC in a given registration area. For example, one or more analytics ID in the list may not be authorised when the requested analytics ID is not supported for the slice/S-NSSAI that the UE is requesting for. For example, one or more analytics ID in the list may not be authorised when the gNB does not support that analytics ID that the UE 401 is requesting.

In examples when the AMF 405 uses the list of subscribed analytics IDs for the UE 401 stored at the 5GC, the AMF 405 may communicate with the UDM 409/NWDAF 407 in order to access/retrieve the information.

It should be understood that in other examples, other suitable NFs of the 5GC may perform the steps of S403.

In S404, the AMF 405 provides the list of authorised analytics IDs to the gNB 403. In an example, the list of authorised analytics IDs is provided within an initial context setup (ICS) request message. In an example, the list of authorised analytics IDs is provided within a handover request.

In S405, the gNB 403 determines an analytics identity from the list of authorised analytics identities for use with the UE 401. Then, the gNB 403 uses an ML model with the terminal. The ML model being associated with the determined analytics identity.

In an example, a service provided by the gNB 403 for the UE 401 could be built on one or more ML models.

In an example, the gNB 403 (RAN) uses a plurality of the analytics IDs that have been authorised by the 5GC, to provide a plurality of services to the UE 401. The ML models associated with the authorised analytics IDs for the UE 401 may provide a differentiated provision of services for the UE 401.

In S406 of FIG. 4*b*, the list of analytics IDs supported at the gNB 403 changes. The support for the analytics IDs at the gNB 403 may change due to a variety of different reasons. The gNB 403 provides the updated list of analytics IDs supported at the gNB 403 to the 5GC.

In an example, if the UE 401 moves to a different TAI within the same gNB 403, and the list of supported analytics IDs changes, then the gNB 403 shall use those analytics IDs that are applicable to that different TAI.

In S407, if the UE moves to a different gNB, then the 5GC may provide a new list of applicable analytics IDs to the target gNB as part of HO signalling.

In another example, if the subscription of the UE 401 updates, i.e. analytics IDs are changed, then the 5GC (AMF 405) indicates the updated list of authorized analytics IDs to the gNB 403. The AMF 405 may provide the new list of authorized analytics IDs using a next-generation application protocol (NGAP) UE context modification procedure.

In another example, if there a cell level change impacting the supported analytics IDs, then the gNB 403 (RAN) may update the 5GC of this change in support. The gNB 403 may use an NGAP RAN configuration update procedure to update the 5GC. An example of a cell level change may be a locking of a cell, or a deletion of a cell.

In S408, if the UE 401 moves to an RRC_Inactive state and the authorized ML model(s) can still be used, then the gNB 403 may use the authorised ML model(s) in any RAN notification areas (RNAs) corresponding to the TAI(s) for which the ML model(s) was authorised in. For example, if a first analytics ID corresponding to a first ML model was authorised by the 5GC, wherein the first analytics ID is for TAI 1. Then, when the UE moves to RRC_Inactive, the first analytics ID may be used in any RNAs corresponding to TAI 1.

It should be understood that in other examples, other suitable devices and network functions (NFs) may perform the communications as per FIGS. 4*a* and 4*b*. For example, a terminal or other device may replace the UE. For example, other core network NFs may replace the AMF/NWDAF/UDM.

One or more of the following examples discussed above enables the authorization of user-subscribed ML based models/services that can be used in the RAN. AI/ML based services are able to be associated with TAIs, RNAs, slices etc., which gives operators flexibility in how they would like to offer such services. The procedure further ensures that there is consistency between network entities in scenarios such as, for example, mobility, RRC-INACTIVE, and change of slices.

Figure 5:
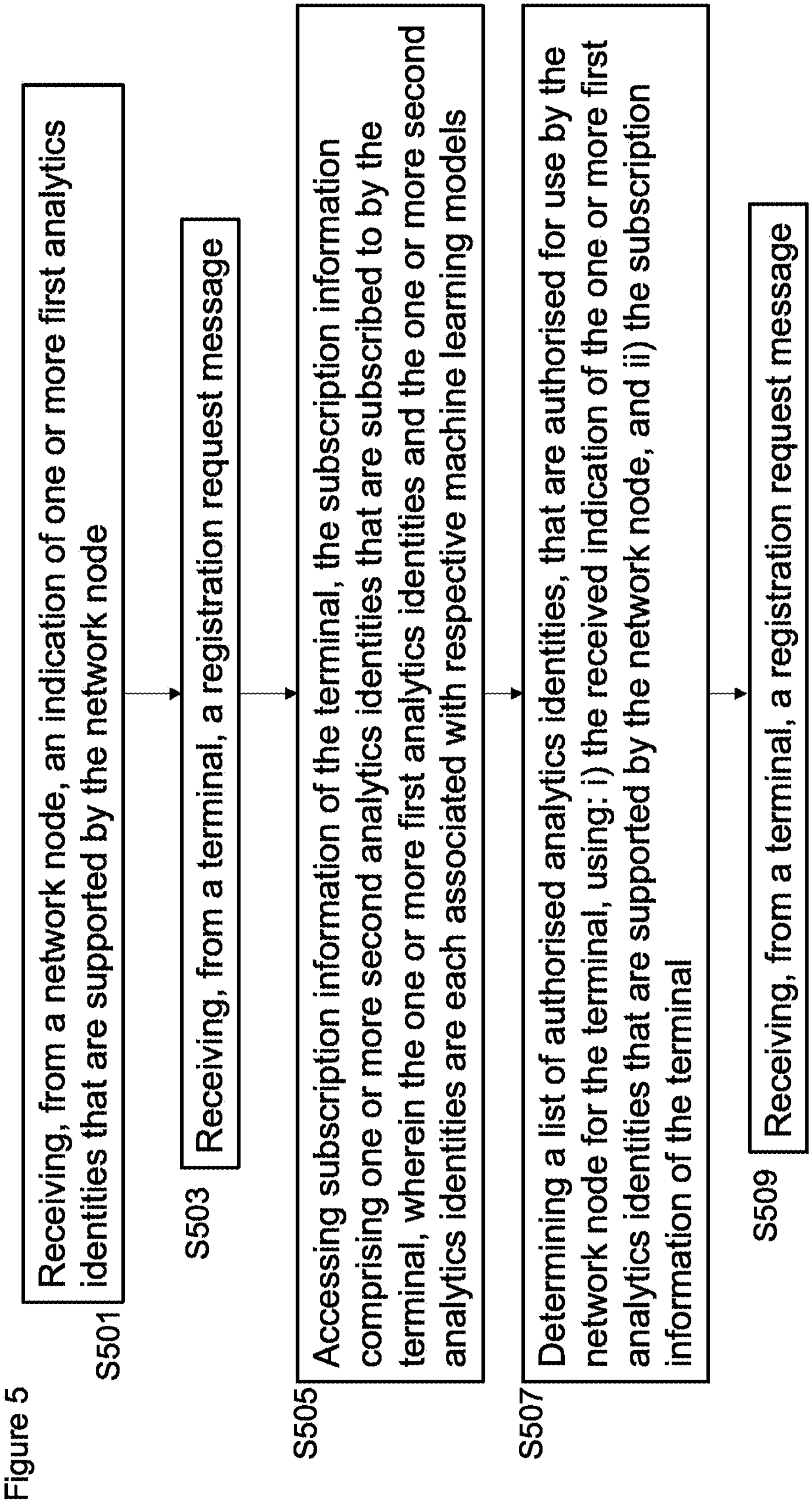
FIG. 5 shows an example method flow diagram performed by a core network entity.

FIG. 5 shows an example method flow performed by an apparatus. The apparatus may be comprised within a core network entity. In an example, the core network entity may be an AMF.

In S501, the method comprises receiving, from a network node, an indication of one or more first analytics identities that are supported by the network node.

In S503, the method comprises receiving, from a terminal, a registration request message.

In S505, the method comprises accessing subscription information of the terminal, the subscription information comprising one or more second analytics identities that are subscribed to by the terminal, wherein the one or more first analytics identities and the one or more second analytics identities are each associated with respective machine learning models.

In S507, the method comprises determining a list of authorised analytics identities, that are authorised for use by the network node for the terminal, using: i) the received indication of the one or more first analytics identities that are supported by the network node, and ii) the subscription information of the terminal.

In S509, the method comprises providing, to the network node, the list of authorised analytics identities that are authorised for use by the network node for the terminal.

Figure 6:
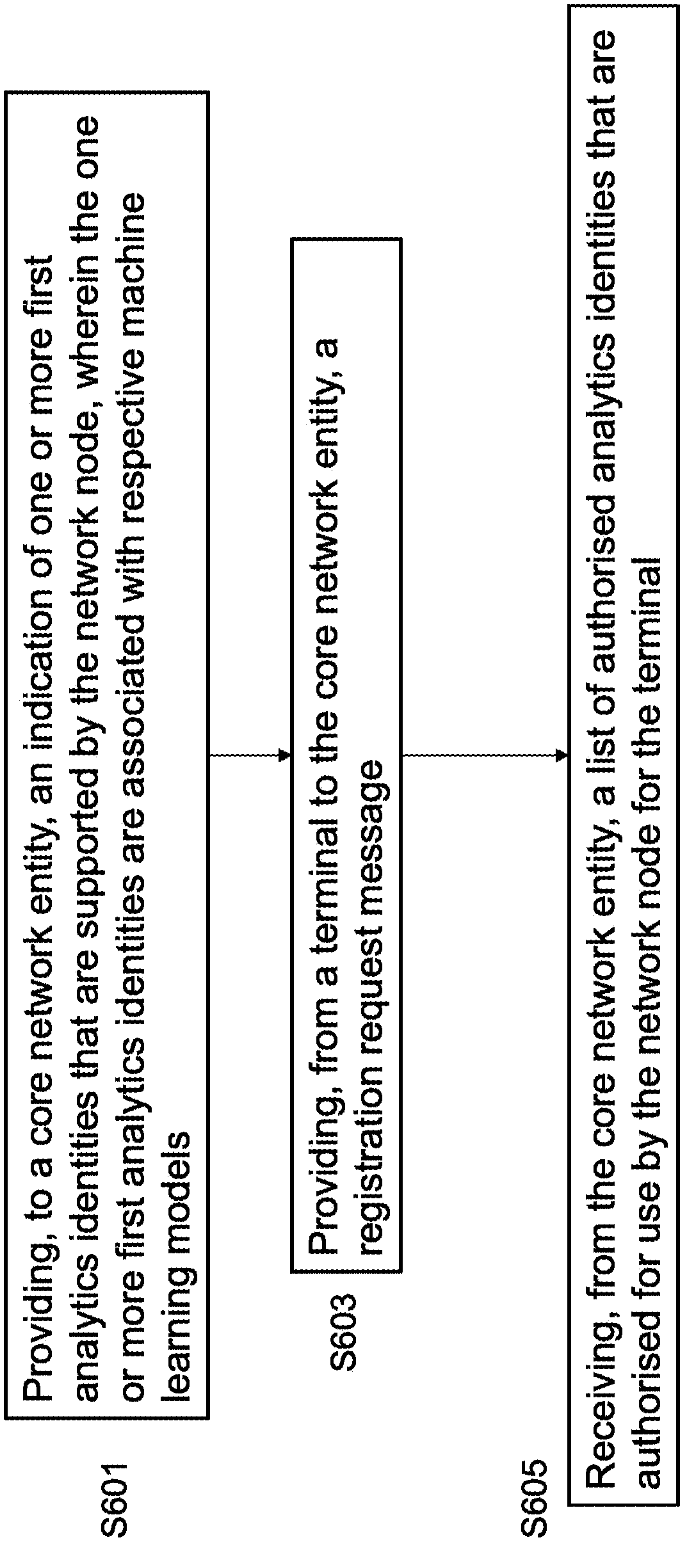
FIG. 6 shows another example method flow diagram performed by a network node.

FIG. 6 shows an example method flow performed by an apparatus. The apparatus may be comprised within a network node. In an example, the apparatus may be comprised within a gNB.

In S601, the method comprises providing, to a core network entity, an indication of one or more first analytics identities that are supported by the network node, wherein the one or more first analytics identities are associated with respective machine learning models.

In S603, the method comprises providing, from a terminal to the core network entity, a registration request message.

In S605, the method comprises receiving, from the core network entity, a list of authorised analytics identities that are authorised for use by the network node for the terminal.

Figure 7:
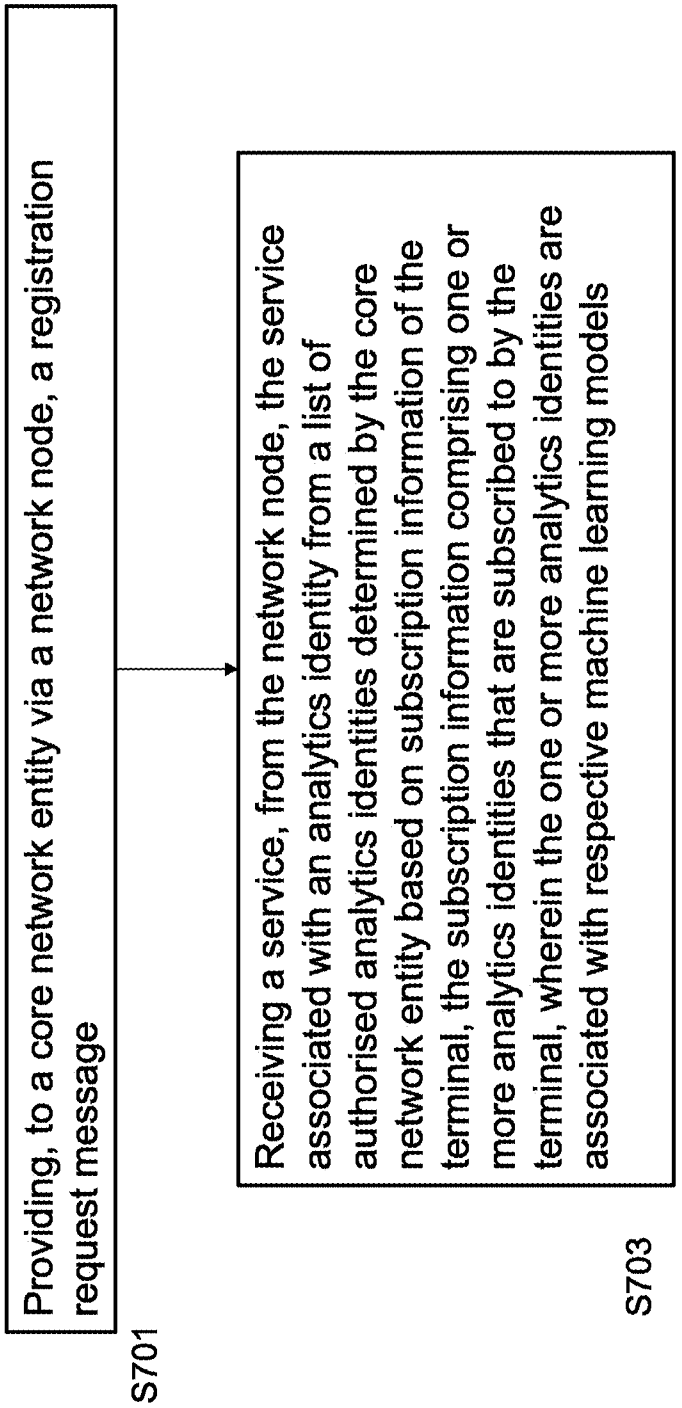
FIG. 7 shows another example method flow diagram performed by a terminal.

FIG. 7 shows an example method flow performed by an apparatus. The apparatus may be comprised within a terminal or UE.

In S701, the method comprises providing, to a core network entity via a network node, a registration request message.

In S703 the method comprises receiving a service, from the network node, the service associated with an analytics identity from a list of authorised analytics identities determined by the core network entity based on subscription information of the terminal, the subscription information comprising one or more analytics identities that are subscribed to by the terminal, wherein the one or more analytics identities are associated with respective machine learning models.

Figure 8:
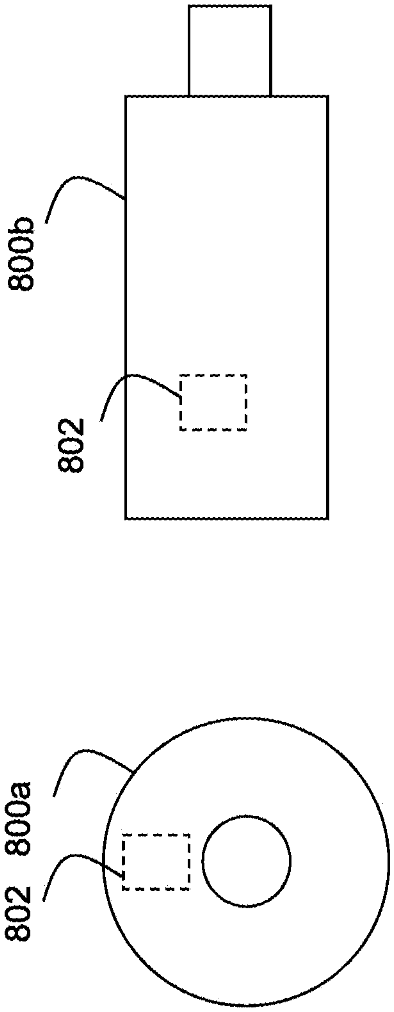
FIG. 8 shows a schematic representation of a non-volatile memory medium storing instructions which when executed by a processor allow a processor to perform one or more of the steps of the methods of FIGS. 5 to 7.

FIG. 8 shows a schematic representation of non-volatile memory media 800*a* (e.g. computer disc (CD) or digital versatile disc (DVD)) and 800*b* (e.g. universal serial bus (USB) memory stick) storing instructions and/or parameters 802 which when executed by a processor allow the processor to perform one or more of the steps of the methods of FIG. 5, FIG. 6, or FIG. 7.

It is noted that while the above describes example embodiments, there are several variations and modifications which may be made to the disclosed solution without departing from the scope of the present invention.

The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively, or additionally some examples may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus for a core network entity, the apparatus comprising:

a processor; and a memory comprising computer-executable instructions that, when executed cause the apparatus to perform the following operations:

receiving, from a network node, an indication of one or more first analytics identities that are supported by the network node, the one or more first analytics identities that are supported by the network node are associated with a tracking area identifier of the network node and network slice support assistance information of the network node;

receiving, from a terminal, a registration request message, the registration request message comprising a list of requested analytics identifiers that comprise a list of services associated with analytics identifiers that the terminal requests access to;

accessing subscription information of the terminal, the subscription information comprising one or more second analytics identities that are subscribed to by the terminal, wherein the one or more first analytics identities and the one or more second analytics identities are each associated with respective machine learning models;

determining a list of authorized analytics identities that are authorized for use by the network node for the terminal, using: the received indication of the one or more first analytics identities that are supported by the network node, the subscription information of the terminal, and the registration request message;

providing, to the network node, the list of authorized analytics identities that are authorized for use by the network node for the terminal;

determining that the terminal has moved to a radio resource control inactive state; and causing the terminal to continue to use a machine learning model associated with the at least one of the authorized analytics identities while the terminal is in a radio resource control state, in a radio access network notification area corresponding to a tracking area identifier of the network node that the machine learning model has been authorized in.

2. The apparatus according to claim 1, wherein the indication of one or more analytics identities that are supported by the network node is received as part of a next generation setup procedure.

3. The apparatus according to claim 2, wherein accessing subscription information of the terminal comprises retrieving the subscription information of the terminal from a further core network entity.

4. The apparatus according to claim 3, wherein determining the list of authorized analytics identities that are authorized for use by the network node for the terminal comprises: determining analytics identities that are subscribed to by the terminal, and supported by the network node.

5. The apparatus according to claim 4, wherein the computer-executable instructions further cause the apparatus to perform the following operations:

receiving, from a network node, an update message, the update message comprising an indication of one or more third analytics identities that are supported by the network node; and determining an updated list of authorized analytics identities that are authorized for use by the network node for the terminal using the received indication of the one or more third analytics identities that are supported by the network node.

6. The apparatus according to claim 5, wherein the update message is based on a change in the support for the one or more analytics identities at the network node.

7. The apparatus according to claim 6, wherein the computer-executable instructions further cause the apparatus to perform the following operations:

determining that the terminal has moved into coverage of a target network node; and providing the list of authorized analytics identities to the target network node as part of handover signaling.

8. A system comprising:

an apparatus;

a terminal;

a processor; and a memory comprising computer-executable instructions that, when executed by the processor, cause the processor to perform the following operations:

receiving, from a network node, an indication of one or more first analytics identities that are supported by the network node, the one or more first analytics identities that are supported by the network node are associated with a tracking area identifier of the network node and network slice support assistance information of the network node;

receiving, from the terminal, a registration request message, the registration request message comprising a list of requested analytics identifiers that comprise a list of services associated with analytics identifiers that the terminal requests access to;

accessing subscription information of the terminal, the subscription information comprising one or more second analytics identities that are subscribed to by the terminal, wherein the one or more first analytics identities and the one or more second analytics identities are each associated with respective machine learning models;

determining a list of authorized analytics identities that are authorized for use by the network node for the terminal, using: the received indication of the one or more first analytics identities that are supported by the network node, the subscription information of the terminal, and the registration request message;

providing, to the network node, the list of authorized analytics identities that are authorized for use by the network node for the terminal;

determining that the terminal has moved to a radio resource control inactive state; and causing the terminal to continue to use a machine learning model associated with the at least one of the authorized analytics identities while the terminal is in a radio resource control state, in a radio access network notification area corresponding to a tracking area identifier of the network node that the machine learning model has been authorized in.

9. The system according to claim 8, wherein the indication of one or more analytics identities that are supported by the network node is received as part of a next generation setup procedure.

10. The system according to claim 9, wherein accessing subscription information of the terminal comprises retrieving the subscription information of the terminal from a further core network entity.

11. The system according to claim 10, wherein determining the list of authorized analytics identities that are authorized for use by the network node for the terminal comprises: determining analytics identities that are subscribed to by the terminal, and supported by the network node.

12. The system according to claim 11, wherein the computer-executable instructions further cause the processor to perform the following operations:

receiving, from a network node, an update message, the update message comprising an indication of one or more third analytics identities that are supported by the network node; and determining an updated list of authorized analytics identities that are authorized for use by the network node for the terminal using the received indication of the one or more third analytics identities that are supported by the network node.

13. The system according to claim 12, wherein the update message is based on a change in the support for the one or more analytics identities at the network node.

14. The system according to claim 13, wherein the computer-executable instructions further cause the processor to perform the following operations:

determining that the terminal has moved into coverage of a target network node; and providing the list of authorized analytics identities to the target network node as part of handover signaling.

15. A method comprising:

receiving, from a network node, an indication of one or more first analytics identities that are supported by the network node, the one or more first analytics identities that are supported by the network node are associated with a tracking area identifier of the network node and network slice support assistance information of the network node;

receiving, from a terminal, a registration request message, the registration request message comprising a list of requested analytics identifiers that comprise a list of services associated with analytics identifiers that the terminal requests access to;

accessing subscription information of the terminal, the subscription information comprising one or more second analytics identities that are subscribed to by the terminal, wherein the one or more first analytics identities and the one or more second analytics identities are each associated with respective machine learning models;

determining a list of authorized analytics identities that are authorized for use by the network node for the terminal, using: the received indication of the one or more first analytics identities that are supported by the network node, the subscription information of the terminal, and the registration request message;

providing, to the network node, the list of authorized analytics identities that are authorized for use by the network node for the terminal;

determining that the terminal has moved to a radio resource control inactive state; and causing the terminal to continue to use a machine learning model associated with the at least one of the authorized analytics identities while the terminal is in a radio resource control state, in a radio access network notification area corresponding to a tracking area identifier of the network node that the machine learning model has been authorized in.

16. The method according to claim 15, wherein the indication of one or more analytics identities that are supported by the network node is received as part of a next generation setup procedure.

17. The method according to claim 16, wherein accessing subscription information of the terminal comprises retrieving the subscription information of the terminal from a further core network entity.

18. The method according to claim 17, wherein determining the list of authorized analytics identities that are authorized for use by the network node for the terminal comprises: determining analytics identities that are subscribed to by the terminal, and supported by the network node.

19. The method according to claim 18, further comprising:

receiving, from a network node, an update message, the update message comprising an indication of one or more third analytics identities that are supported by the network node; and determining an updated list of authorized analytics identities that are authorized for use by the network node for the terminal using the received indication of the one or more third analytics identities that are supported by the network node.

20. The method according to claim 19, wherein the update message is based on a change in the support for the one or more analytics identities at the network node.

* * * * *